(12) United States Patent
Mumm

(10) Patent No.: US 10,421,080 B2
(45) Date of Patent: Sep. 24, 2019

(54) MULTI-DOMAIN ELECTROSTATIC FILTER

(71) Applicant: Jill Mumm, Lakeland, FL (US)

(72) Inventor: Jill Mumm, Lakeland, FL (US)

( * ) Notice: Subject to any disclaimer, the term of this patent is extended or adjusted under 35 U.S.C. 154(b) by 0 days.

(21) Appl. No.: 15/892,388

(22) Filed: Feb. 8, 2018

(65) Prior Publication Data

US 2019/0240676 A1    Aug. 8, 2019

(51) Int. Cl.
| | | |
|---|---|---|
| *B03C 3/00* | (2006.01) | |
| *B03C 3/34* | (2006.01) | |
| *B03C 5/02* | (2006.01) | |
| *B01D 35/06* | (2006.01) | |
| *B01D 46/00* | (2006.01) | |

(52) U.S. Cl.
CPC .............. *B03C 5/02* (2013.01); *B03C 3/00* (2013.01); *B03C 3/34* (2013.01); *B01D 35/06* (2013.01); *B01D 46/0032* (2013.01); *B03C 2201/24* (2013.01)

(58) Field of Classification Search
CPC ............ B03C 9/00; B03C 11/00; B01D 35/06
See application file for complete search history.

(56) References Cited

U.S. PATENT DOCUMENTS

| | | |
|---|---|---|
| 6,129,829 A | 10/2000 | Thompson |
| 8,021,523 B2 | 9/2011 | Jarvis |
| 2017/0173593 A1* | 6/2017 | Woods ................. B01D 35/06 |
| 2018/0250687 A1 | 9/2018 | Woods et al. |

\* cited by examiner

*Primary Examiner* — Salil Jain

(57) ABSTRACT

Multi-domain electrostatic filters and methods, systems and computer readable media for control thereof are described.

10 Claims, 7 Drawing Sheets

MULTI-DOMAIN ELECTROSTATIC FILTER

Embodiments relate generally to filters, and more particularly, to multi-domain electrostatic filters and methods, systems and computer readable media for control thereof.

In general, some implementations include a multi-domain electrostatic filter system comprising a multi-domain electrostatic filter having an electrostatic filter vessel and a removable multi-domain electrostatic filter cartridge. The system also includes a high voltage generator, a pump, and a controller coupled to the high voltage generator and the pump, the controller being configured to cause the pump to pump fluid through the multi-domain electrostatic filter and to cause the high voltage generator to supply high voltage direct current (DC) electrical energy to the multi-domain electrostatic filter. The removable multi-domain electrostatic filter cartridge can include a plurality of chemically treated positive electrode plates and a plurality chemically treated negative electrode plates arranged in an alternating sequence, with each pair of chemically treated positive electrode plates and chemically treated negative electrode plates being separated by a respective filter media member. The chemically treated positive electrode plates can be electrically connected to each other, to the electrically conductive filter vessel, and, in turn, to an electrical ground. The chemically treated negative electrode plates can be electrically connected to each other and to a high voltage supply coupled to an output of the high voltage generator.

The plurality of chemically treated negative electrode plates of the multi-domain electrostatic filter cartridge are movable from a first position when the multi-domain electrostatic filter cartridge is not engaged with the filter vessel to a second position when the multi-domain electrostatic filter cartridge is engaged with the filter vessel. When the plurality of chemically treated negative electrode plates is in the second position, a multi-domain configuration is created that includes a first domain having a first distance between a chemically treated negative electrode plate and a chemically treated positive electrode plate disposed below the chemically treated negative electrode plate, and a second distance between the chemically treated negative electrode plate and a chemically treated positive electrode plate disposed above the chemically treated negative electrode plate. The first distance can be different than the second distance and creates alternating compressed densities of the filter media disposed between respective pairs of chemically treated positive electrode plates and disposed below the chemically treated negative electrode plate. In some implementations, the first distance can be greater than the second distance.

In some implementations, the filter vessel includes a threaded cartridge locking mechanism installed in the filter vessel, the threaded cartridge locking mechanism having a first electrode with an internal buttress to ensure electrical connectivity between the high voltage supply and the chemically treated negative electrode plates. The threaded cartridge locking mechanism can include a filter vessel mechanical connector and a filter cartridge mechanical connector. The first electrode can be connected to the high voltage supply and can be configured to electrically connect to a second electrode when the filter vessel mechanical connector is fully engaged with the filter vessel and the removable multi-domain electrostatic filter cartridge is fully engaged with the filter cartridge mechanical connector. When the first electrode engages the second electrode when the filter vessel mechanical connector is fully engaged with the filter vessel and the removable multi-domain electrostatic filter cartridge is fully engaged with the filter cartridge mechanical connector, alternating filter media within the removable multi-domain electrostatic filter cartridge are compressed by an upward movement of the chemically treated negative electrode plates.

In some implementations, the system can include a plurality of sensors, wherein the plurality of sensors include a first group of sensors in communication with an inlet side of the multi-domain electrostatic filter system, a second group of sensors in communication with an outlet side of the multi-domain electrostatic filter system, and a high voltage current sensor. The first group of sensors can include a flow switch and a vacuum transducer. The second group of sensors can include a pressure transducer, a water sensor and a temperature sensor.

In some implementations, the output of the high voltage generator is about −15 kV. In some implementations, the positive electrode plates each have a first diameter and the negative electrode plates each have a second diameter, and wherein the first diameter is larger than the second diameter. In some implementations, the plurality of sensors further include a float switch arranged to detect a leak of fluid from the multi-domain electrostatic filter system.

The filter vessel can include a single chamber, and wherein the multi-domain electrostatic filter system is configured to filter fluid passing through the multi-domain electrostatic filter and to remove water from the fluid passing through the multi-domain electrostatic filter within the single chamber.

In some implementations, the chemically treated positive electrode plates and the chemically treated negative electrode plates are formed by chemically treating positive electrode plates and negative electrode plates. Chemically treating the plates can include removing an oxide layer from a surface of the positive electrode plates and the negative electrode plates by submerging the positive electrode plates and the negative electrode plates in a first chemical bath, and removing the positive electrode plates and the negative electrode plates from the first chemical bath. Chemically treating can also include drying the positive electrode plates and the negative electrode plates, and spraying the positive electrode plates and the negative electrode plates with a chemical. Chemically treating can further include permitting the chemical to evaporate from surfaces of the positive electrode plates and the negative electrode plates, and submerging the positive electrode plates and the negative electrode plates in a second chemical bath. Chemically treating can also include removing the positive electrode plates and the negative electrode plates from the second chemical bath, and drying the positive electrode plates and the negative electrode plates to reform an oxide layer.

Some implementations can include a method of filtering a fluid using a multi-domain electrostatic filter system. The method can include pumping fluid through a multi-domain electrostatic filter having an electrostatic filter vessel and a removable multi-domain electrostatic filter cartridge using a pump controlled by a controller, and applying high voltage direct current to the multi-domain electrostatic filter, wherein the high voltage direct current is supplied by a high voltage generator controlled by the controller.

The removable multi-domain electrostatic filter cartridge can include a plurality of chemically treated positive electrode plates and a plurality chemically treated negative electrode plates arranged in an alternating sequence, with each pair of chemically treated positive electrode plates and chemically treated negative electrode plates being separated by a respective filter media member. The chemically treated positive electrode plates can be electrically connected to each other, to the electrically conductive filter vessel, and, in turn, to an electrical ground. The chemically treated negative electrode plates can be electrically connected to each other and to a high voltage supply coupled to an output of the high voltage generator.

The plurality of chemically treated negative electrode plates of the multi-domain electrostatic filter cartridge are movable from a first position when the multi-domain electrostatic filter cartridge is not engaged with the filter vessel to a second position when the multi-domain electrostatic filter cartridge is engaged with the filter vessel. When the plurality of chemically treated negative electrode plates is in the second position, a multi-domain configuration is created that includes a first domain having a first distance between a chemically treated negative electrode plate and a chemically treated positive electrode plate disposed below the chemically treated negative electrode plate, and a second distance between the chemically treated negative electrode plate and a chemically treated positive electrode plate disposed above the chemically treated negative electrode plate. The first distance can be different than the second distance and creates alternating compressed densities of the filter media disposed between respective pairs of chemically treated positive electrode plates and disposed below the chemically treated negative electrode plate. In some implementations, the first distance can be greater than the second distance.

In some implementations, the filter vessel includes a threaded cartridge locking mechanism installed in the filter vessel, the threaded cartridge locking mechanism having a first electrode with an internal buttress to ensure electrical connectivity between the high voltage supply and the chemically treated negative electrode plates. The threaded cartridge locking mechanism can include a filter vessel mechanical connector and a filter cartridge mechanical connector. The first electrode can be connected to the high voltage supply and can be configured to electrically connect to a second electrode when the filter vessel mechanical connector is fully engaged with the filter vessel and the removable multi-domain electrostatic filter cartridge is fully engaged with the filter cartridge mechanical connector. When the first electrode engages the second electrode when the filter vessel mechanical connector is fully engaged with the filter vessel and the removable multi-domain electrostatic filter cartridge is fully engaged with the filter cartridge mechanical connector, alternating filter media within the removable multi-domain electrostatic filter cartridge are compressed by an upward movement of the chemically treated negative electrode plates.

In some implementations, the system can include a plurality of sensors, wherein the plurality of sensors include a first group of sensors in communication with an inlet side of the multi-domain electrostatic filter system, a second group of sensors in communication with an outlet side of the multi-domain electrostatic filter system, and a high voltage current sensor. The first group of sensors can include a flow switch and a vacuum transducer. The second group of sensors can include a pressure transducer, a water sensor and a temperature sensor.

In some implementations, the output of the high voltage generator is about −15 kV. In some implementations, the positive electrode plates each have a first diameter and the negative electrode plates each have a second diameter, and wherein the first diameter is larger than the second diameter. In some implementations, the plurality of sensors further includes a float switch arranged to detect a leak of fluid from the multi-domain electrostatic filter system.

The filter vessel can include a single chamber, and wherein the multi-domain electrostatic filter system is configured to filter fluid passing through the multi-domain electrostatic filter and to remove water from the fluid passing through the multi-domain electrostatic filter within the single chamber.

In some implementations, the chemically treated positive electrode plates and the chemically treated negative electrode plates are formed by chemically treating positive electrode plates and negative electrode plates. Chemically treating the plates can include removing an oxide layer from a surface of the positive electrode plates and the negative electrode plates by submerging the positive electrode plates and the negative electrode plates in a first chemical bath, and removing the positive electrode plates and the negative electrode plates from the first chemical bath. Chemically treating can also include drying the positive electrode plates and the negative electrode plates, and spraying the positive electrode plates and the negative electrode plates with a chemical. Chemically treating can further include permitting the chemical to evaporate from surfaces of the positive electrode plates and the negative electrode plates, and submerging the positive electrode plates and the negative electrode plates in a second chemical bath. Chemically treating can also include removing the positive electrode plates and the negative electrode plates from the second chemical bath, and drying the positive electrode plates and the negative electrode plates.

Some implementations can include a method of chemically treating positive electrode plates and negative electrode plates, and wherein the method comprises removing an oxide layer from a surface of the positive electrode plates and the negative electrode plates by submerging the positive electrode plates and the negative electrode plates in a first chemical bath and removing the positive electrode plates and the negative electrode plates from the first chemical bath. The method can also include drying the positive electrode plates and the negative electrode plates, and spraying the positive electrode plates and the negative electrode plates with a chemical. The method can further include permitting the chemical to evaporate from surfaces of the positive electrode plates and the negative electrode plates, and submerging the positive electrode plates and the negative electrode plates in a second chemical bath. The method can also include removing the positive electrode plates and the negative electrode plates from the second chemical bath, and drying the positive electrode plates and the negative electrode plates.

DETAILED DESCRIPTION

Figure 1:
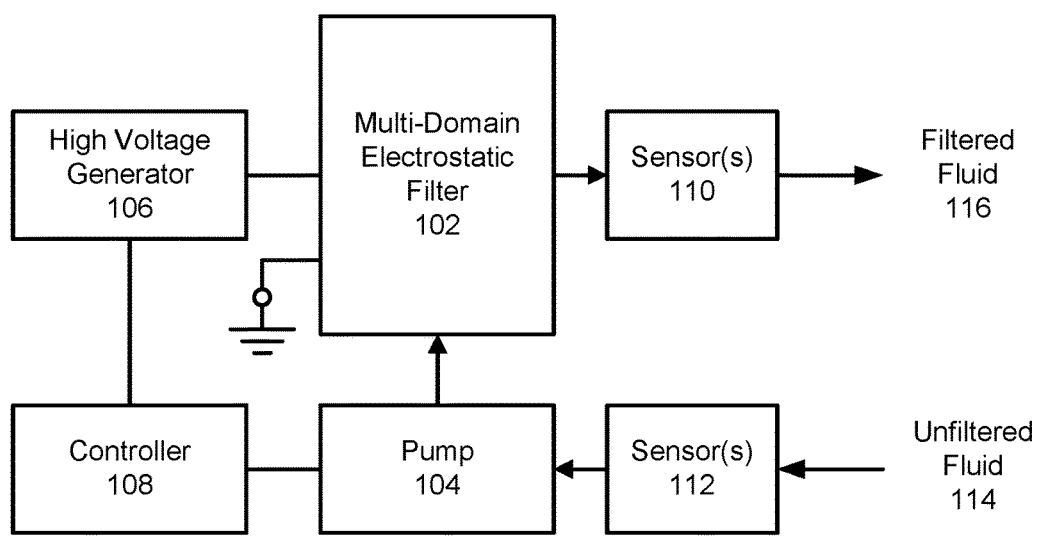
FIG. 1 is a diagram of an example multi-domain electrostatic filter system in accordance with some implementations.

FIG. 1 is a diagram of an example multi-domain electrostatic filter system 100 in accordance with some implementations. The system 100 includes a multi-domain electrostatic filter 102 having a filter vessel (e.g., a cylindrical electrically conductive filter vessel, such as a stainless steel tank with a removable lid) and a removable filter cartridge, a pump 104, a high voltage generator 106 (e.g., a Glassman high voltage generator), a controller 108, one or more outlet sensors 110, and one or more inlet sensors 112.

In operation, the controller 108 controls the pump 104 to pump fluid (e.g., hydraulic fluid) through the multi-domain electrostatic filter 102. The controller 108 also controls the high voltage generator 106 to supply high voltage (e.g., about −15 kV DC) to the multi-domain electrostatic filter 102. As described in greater detail below, the multi-domain electrostatic filter 102 includes filter media and chemically treated electrode plates that operate to filter the fluid being pumped through the multi-domain electrostatic filter 102 and to remove water from the fluid being pumped through the multi-domain electrostatic filter 102 within a single filter vessel.

The negative high voltage DC from the high voltage generator forms the negative side of the DC voltage within the multi-domain electrostatic filter 102 and an electrical ground forms the positive side of the DC voltage within the multi-domain electrostatic filter 102. The filter media 206 and electrode plates (208 and 210) operate in conjunction with the high voltage to cause impurities (e.g., varnish) to be filtered from the fluid being pumped through the multi-domain electrostatic filter 102 to be filtered and to cause water to be removed from the fluid (e.g., through electrolysis caused by the high voltage DC being supplied to the chemically treated electrode plates). The filter media members 206 can include foam filter media.

In some implementations, sensors include a first group of sensors 112 in communication with an inlet side of the multi-domain electrostatic filter system, a second group of sensors 110 in communication with an outlet side of the multi-domain electrostatic filter system, and a high voltage current sensor. The first group of sensors can include a flow switch and a vacuum transducer. The second group of sensors can include a pressure transducer, a water sensor and a temperature sensor.

The filter vessel can also include a valve disposed on the top of the filter vessel to permit venting of any gases that may be present or occur during a filtering process (e.g., oxygen or hydrogen that may occur as a result of electrolysis of water within hydraulic fluid).

Figure 2:
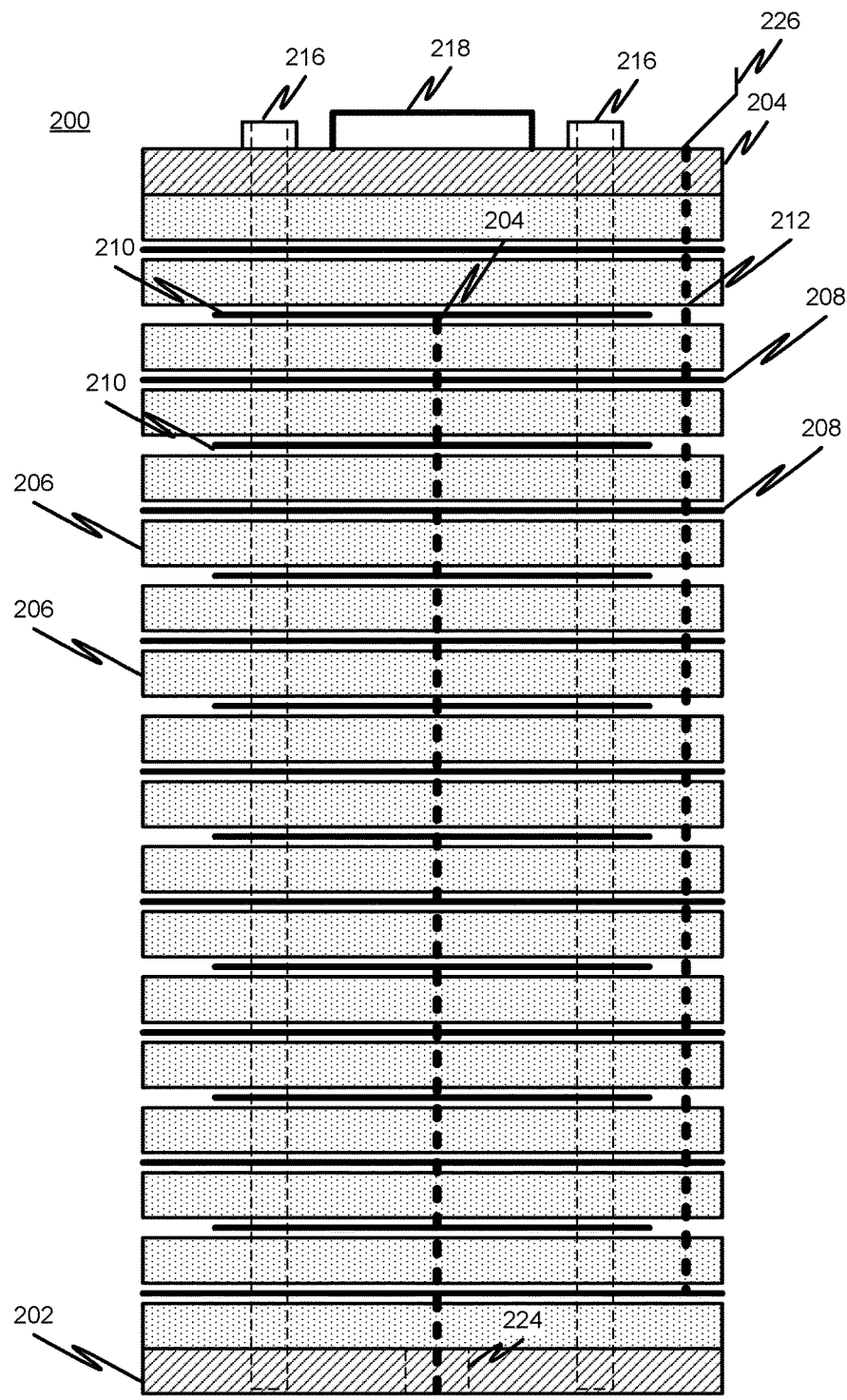
FIG. 2 is a diagram of an example removable multi-domain electrostatic filter cartridge in accordance with some implementations.
Figure 3:
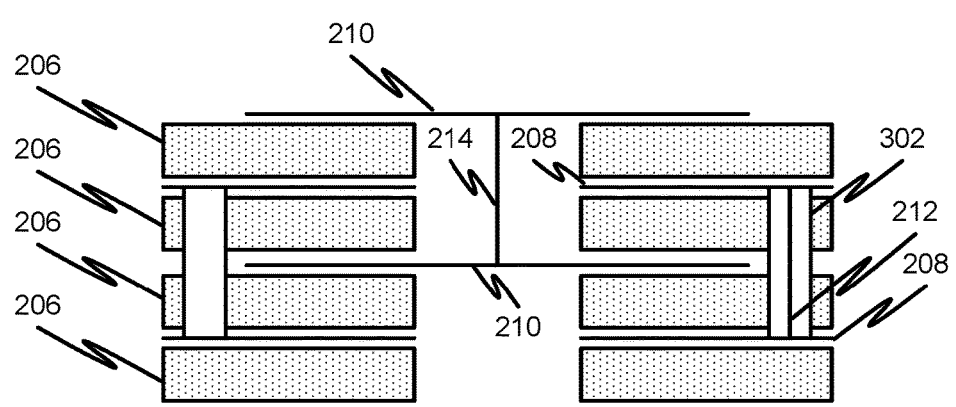
FIG. 3 is a diagram showing detail of a removable multi-domain electrostatic filter cartridge in accordance with some implementations.

FIGS. 2 and 3 are diagrams of an example removable multi-domain electrostatic filter cartridge 200 in accordance with some implementations. The cartridge 200 includes a base plate 202 with a threaded connector 224, a negative electrode plate connector 204, a plurality of filter media members 206, a plurality of chemically treated positive electrode plates 208, a plurality of chemically treated negative electrode plates 210, a positive electrode plate connector 212, a top plate 214, cartridge assembly connectors 216, a cartridge handle 218, and a grounding tab 226. The grounding tab 226 is connected to the chemically treated positive electrode plates 208 via the positive electrode plate connector 212 and is configured to contact the electrically conductive filter vessel when the cartridge is inserted into the vessel and connect the chemically treated positive electrode plates with the electrically conductive filter vessel, which is connected to electrical ground.

Details of the mechanical/electrical connection between the chemically treated positive electrode plates 208 and the chemically treated negative electrode plates 210 are shown in FIG. 3. In particular, the chemically treated positive electrode plates 208 are electrically connected by a positive electrode plate connector 212 that is spaced and insulated by a positive electrode plate connector spacer/insulator 302. The chemically treated negative electrode plates 210 are electrically connected and mechanically connected/spaced by the negative electrode plate connector 214.

An example filter cartridge can include 17 chemically treated electrode plates (e.g., 9 larger positive electrode plates and 8 smaller negative electrode plates) and 18 layers of filter media. In some implementations, the electrode plates can be about 0.025 inches thick, with the smaller plates being about 7.5 inches in diameter and the larger plates being about 10.84 inches in diameter to accommodate the plates fitting within a filter vessel that is about 11 inches in diameter. The electrode plates can be formed from 5052 aluminum and the high voltage feed electrodes and connectors can be formed from 6061 aluminum.

Figure 4:
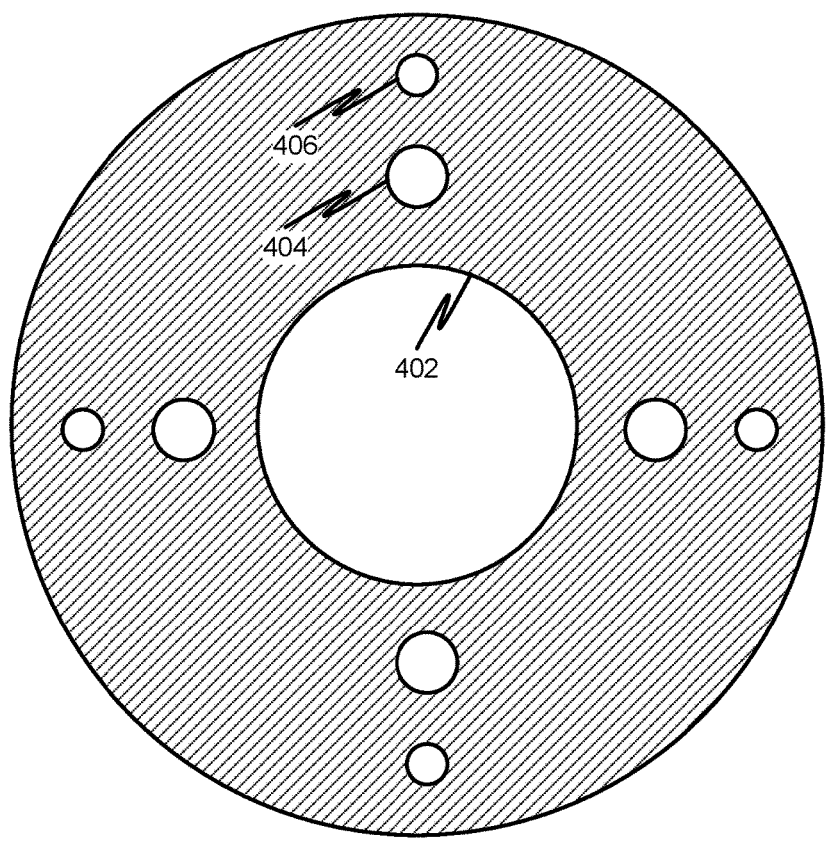
FIG. 4 is a diagram of an example large multi-domain electrostatic filter plate in accordance with some implementations.

FIG. 4 is a diagram showing detail of an example positive chemically treated multi-domain electrostatic filter plate 208 in accordance with some implementations. The filter plate 208 includes one or more openings 404 for cartridge assembly connectors 216 to pass through and one or more openings 406 for attaching the positive electrode plate connection 212.

Figure 5:
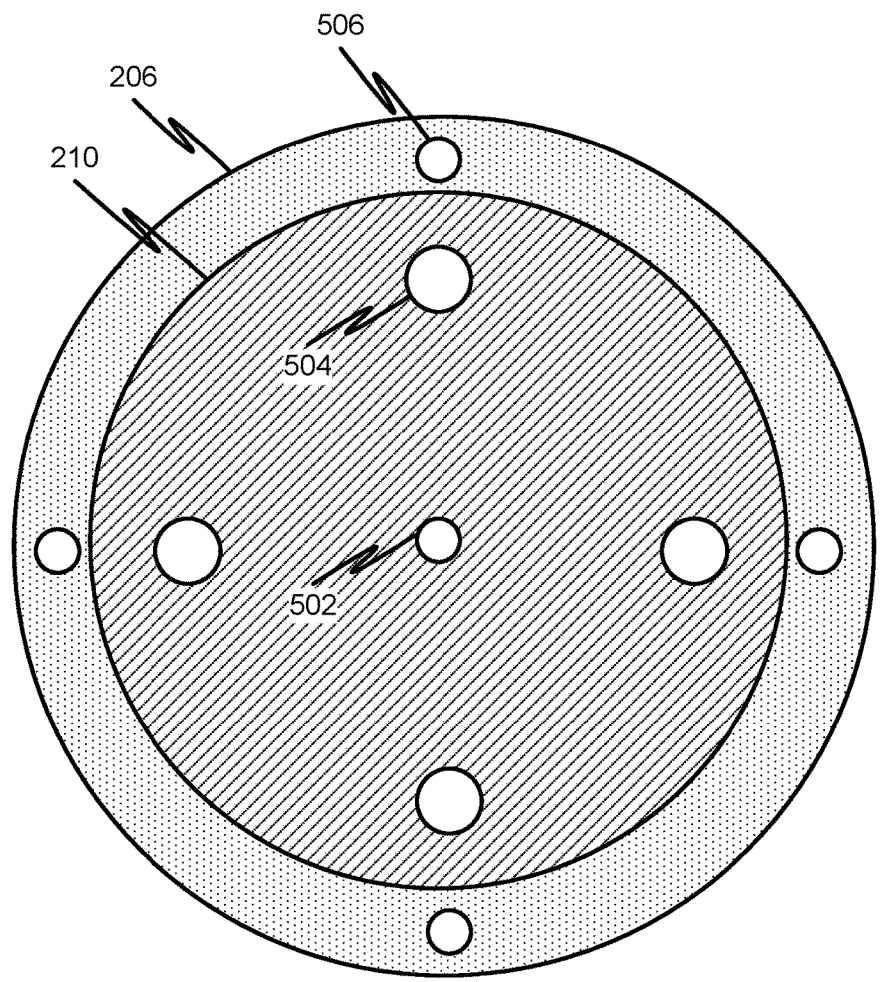
FIG. 5 is a diagram of an example small multi-domain electrostatic filter plate and foam layer in accordance with some implementations.

FIG. 5 is a diagram showing detail of an example chemically treated negative electrode plate 210 and filter media member 206 in accordance with some implementations. The chemically treated negative electrode plate 210 includes one or more openings 504 for cartridge assembly connectors 216 to pass through and an electrode connector attachment opening 502. The filter media member 206 includes one or more openings 506 to permit the positive electrode plate connection 212 to pass through.

Chemical treatment of the positive and negative electrode plates can include a process that uses a chemical treatment (e.g., isopropyl alcohol) to perform three steps: 1) remove an oxide layer from the aluminum electrode plates, 2) dehydrate the aluminum electrode plates, and 3) reform an oxide layer on the electrode plates. An example chemical treatment process can include: 1) submerging the electrode plates in isopropyl alcohol for about 1 minute, 2) drying the plates, 3) spraying the plates with isopropyl alcohol and allowing the alcohol to evaporate, and 4) submerging the electrode plates in isopropyl alcohol a second time and then drying the plates with a clean cloth (e.g., surgical towels).

Figure 6:
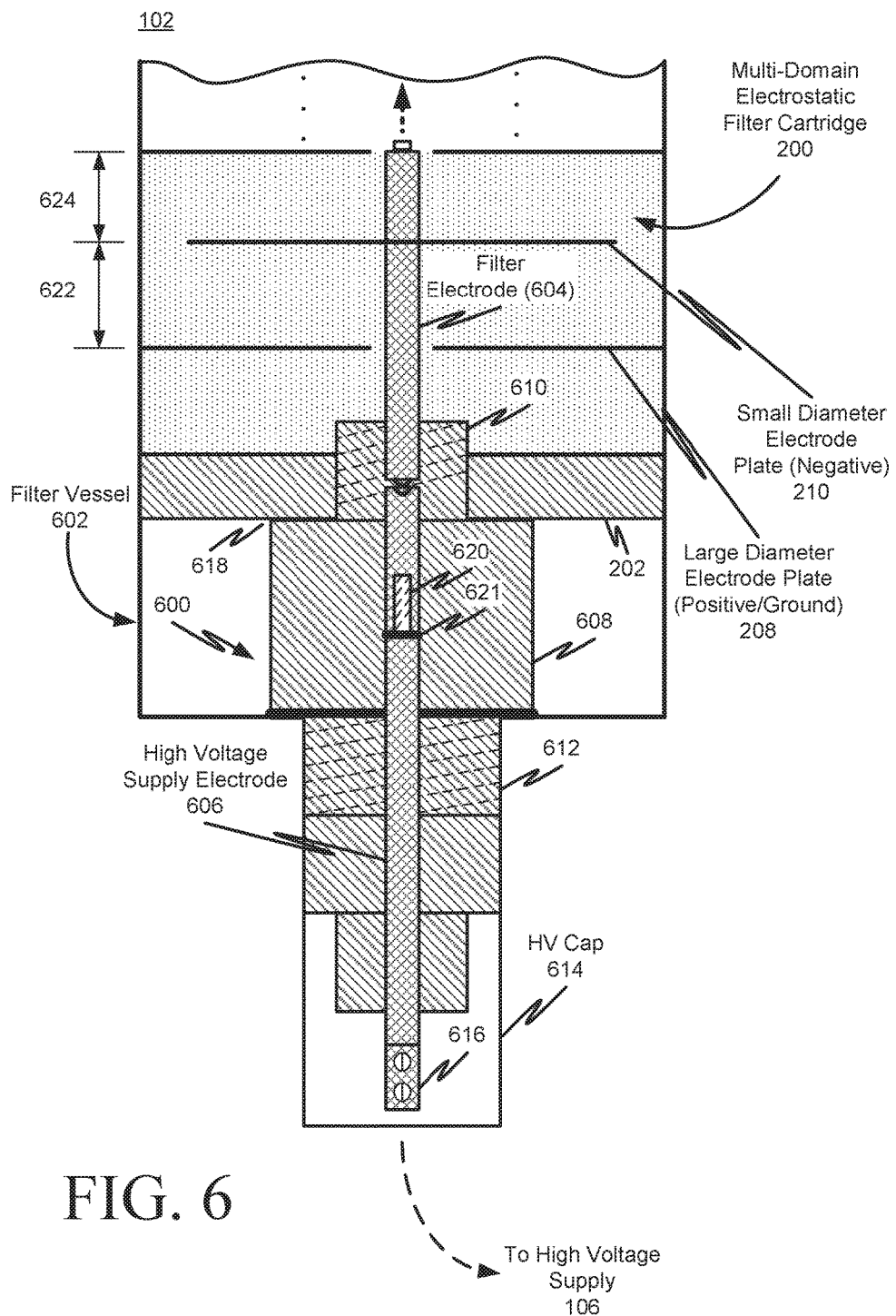
FIG. 6 is a diagram of an example multi-domain electrostatic filter high voltage electrical and mechanical connection in accordance with some implementations.

FIG. 6 is a diagram of an example threaded cartridge locking mechanism 600 in accordance with some implementations. The threaded cartridge locking mechanism can be installed in the filter vessel (e.g., by engaging the threaded filter vessel mechanical connector portion of the threaded cartridge locking mechanism with a threaded portion in the bottom of the filter vessel). The threaded cartridge locking mechanism 600 includes a first electrode 606 with an internal buttress 621 to ensure electrical connectivity between the high voltage supply 106 and the chemically treated negative electrode plates 210. The threaded cartridge locking mechanism 600 includes a filter vessel mechanical connector 612 and a filter cartridge mechanical connector 610. The first electrode 606 is connected to the high voltage supply 106 via connector 616 and is configured to electrically connect to a second electrode 604 when the filter vessel mechanical connector 612 is fully engaged with the filter vessel 602 and the removable multi-domain electrostatic filter cartridge 200 is fully engaged with the filter cartridge mechanical connector 610 (e.g., when the threaded female connector 224 of the cartridge 200 has been turned down onto the threaded filter cartridge mechanical connector 610 to a point at which the bottom plate 202 of the cartridge 200 contacts a top surface of a portion 608 of the threaded cartridge locking mechanism within the filter vessel 602, for example as shown at the contact point 618). The high voltage connector 616 can be covered with a high voltage cap 614 to shield the high voltage connection for safety and to reduce chances for arcing.

When the first electrode 606 engages the second electrode 604, and when the filter vessel mechanical connector 612 is fully engaged with the filter vessel 602, and the removable multi-domain electrostatic filter cartridge 200 is fully engaged with the filter cartridge mechanical connector 610, alternating filter media 206 within the removable multi-domain electrostatic filter cartridge 200 are compressed. The compression of alternating filter media creates a multi-domain field within the multi-domain electrostatic filter, with a first domain having a first distance 622 between a chemically treated negative electrode plate 210 and a chemically treated positive electrode plate 208 disposed below the chemically treated negative electrode plate 210, and a second distance 624 between the chemically treated negative electrode plate 210 and a chemically treated positive electrode plate 208 disposed above the chemically treated negative electrode plate. In some implementations, the first distance 622 is different than the second distance 624 (e.g., the first distance 622 can be about 1.125 inches and the second distance 624 can be about 0.875 inches), which creates alternating compressed densities of the filter media 206 disposed between respective pairs of chemically treated positive electrode plates 208 and chemically treated negative electrode plates 210. The first electrode 606 can be formed from two portions connected by a threaded connector 620 (e.g., where a first portion of the first electrode 606 has a male threaded portion and a second portion of the first electrode 606 has a female threaded portion) and having an internal buttress 621 (e.g., an elastomeric "o" ring or the like) at the connection joint.

The multi-domain field and high voltage negative DC energy provide a filter that is not imposing a charge (or magnetizing) particles within the fluid being filtered such that the particles in the fluid will adhere to positive or negative plates within the filter based on the original charge of the particle. This provides an improved ability to remove varnish and particulates from the fluid being filtered and represents a technical improvement over previous electrostatic filter systems that may impose a charge on particles within a fluid being filtered.

Water removal within the single vessel filter system described herein is achieved by the use of chemically treated positive and negative electrode plates that have been dehydrated and provide an oxide coating that, in the presence of the negative high voltage DC field, separates water molecules into constituent gases, which can be vented out of the filter vessel via a gas release valve disposed on a top of the filter vessel.

Figure 7:
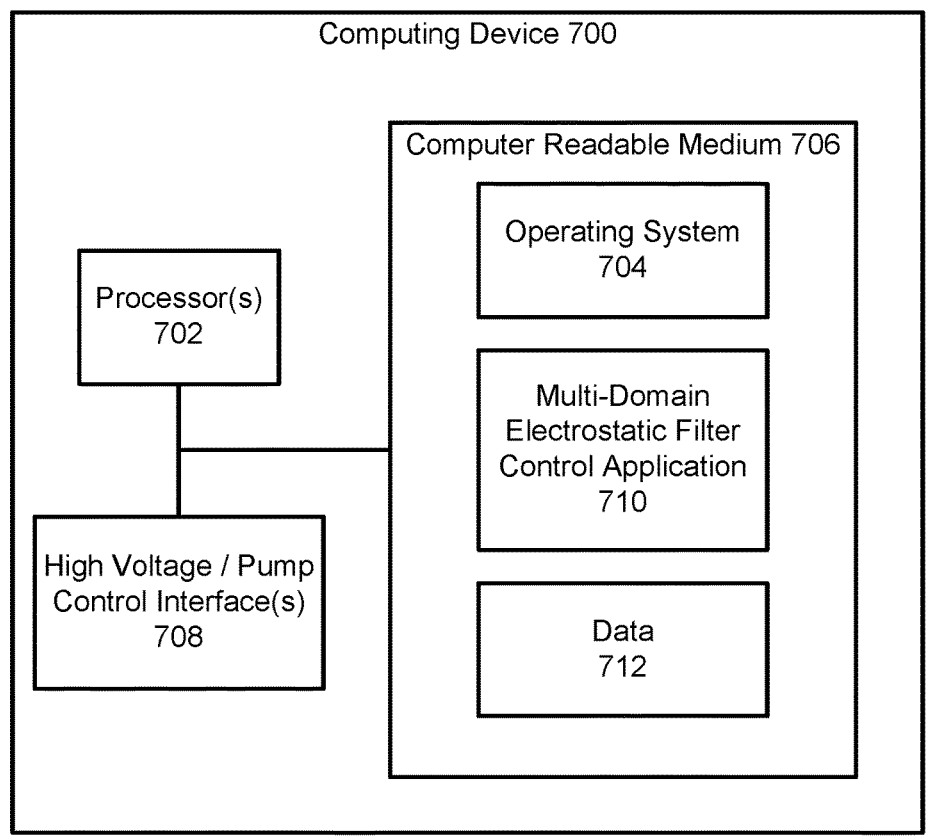
FIG. 7 is a diagram of an example computing device for controlling a multi-domain electrostatic filter system in accordance with some implementations.

FIG. 7 is a diagram of an example computing device 700 in accordance with at least one implementation. The computing device 700 includes one or more processors 702, a nontransitory computer readable medium 706 and a high voltage generator and pump interface 708. The computer readable medium 706 can include an operating system 704, an application 710 for multi-domain electrostatic filter system control and a data section 712 (e.g., for storing sensor readings, operational control settings, etc.).

In operation, the processor 702 may execute the application 710 stored in the computer readable medium 706. The application 710 can include software instructions that, when executed by the processor, cause the processor to perform operations for multi-domain electrostatic filter system control in accordance with the present disclosure.

The application program 710 can operate in conjunction with the data section 712 and the operating system 704.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the electrical engineering, software engineering and electrostatic filter arts.

Moreover, embodiments of the disclosed method, system, and computer readable media (or computer program product) can be implemented in software executed on a programmed general purpose computer, a special purpose computer (e.g., an embedded system forming part of an electrostatic filter system), a microprocessor, a network server or switch, or the like.

It is, therefore, apparent that there is provided, in accordance with the various embodiments disclosed herein, multi-domain electrostatic filters and methods, systems and computer readable media for control thereof.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A multi-domain electrostatic filter system comprising:
a multi-domain electrostatic filter having an electrically conductive filter vessel and a removable multi-domain electrostatic filter cartridge;
a voltage generator;
a pump; and
a controller coupled to the voltage generator and the pump, the controller being configured to cause the pump to pump fluid through the multi-domain electrostatic filter and to cause the voltage generator to supply voltage direct current (DC) electrical energy to the multi-domain electrostatic filter,
wherein the removable multi-domain electrostatic filter cartridge comprises a plurality of positive electrode plates and a plurality of negative electrode plates arranged in an alternating sequence, with each pair of positive electrode plates and negative electrode plates being separated by a respective filter media member,
wherein the positive electrode plates are electrically connected to each other, to the electrically conductive filter vessel, and, in turn, to an electrical ground,
wherein the negative electrode plates are electrically connected to each other and to a voltage supply coupled to an output of the voltage generator,
wherein the plurality of negative electrode plates of the multi-domain electrostatic filter cartridge are movable from a first position when the multi-domain electrostatic filter cartridge is not engaged with the electrically conductive filter vessel to a second position when the multi-domain electrostatic filter cartridge is engaged with the electrically conductive filter vessel, and
wherein when the plurality of negative electrode plates is in the second position, a multi-domain configuration is provided that includes a first domain having a first distance between a first negative electrode plate and a first positive electrode plate disposed below the first negative electrode plate, and a second domain having a second distance between the first negative electrode plate and a second positive electrode plate disposed above the first negative electrode plate, wherein the first domain comprises the first negative electrode plate, the first positive electrode plate, and a first filter medium located in between the first negative electrode plate and the first positive electrode plate, and the second domain comprises the first negative electrode plate, the second positive electrode plate, and a second filter medium located in between the first negative electrode plate and the second positive electrode plate, and wherein the first distance is different from the second distance and the difference between the first distance and the second distance creates alternating compressed densities of filter media disposed between respective pairs of positive electrode plates and negative electrode plates.

2. The multi-domain electrostatic filter system of claim 1, wherein the electrically conductive filter vessel includes a threaded cartridge locking mechanism having a first electrode connecting the voltage supply and the negative electrode plates, wherein the threaded cartridge locking mechanism includes a filter vessel mechanical connector and a filter cartridge mechanical connector, wherein the first electrode is connected to the voltage supply and is configured to electrically connect to a second electrode when the filter vessel mechanical connector is fully engaged with the electrically conductive filter vessel and the removable multi-domain electrostatic filter cartridge is fully engaged with the filter cartridge mechanical connector, and wherein when the first electrode engages the second electrode when the filter vessel mechanical connector is fully engaged with the electrically conductive filter vessel and the removable multi-domain electrostatic filter cartridge is fully engaged with the filter cartridge mechanical connector, alternating filter media disposed between the respective pairs of positive electrode plates and negative electrode plates within the removable multi-domain electrostatic filter cartridge are compressed due to the difference between the first distance and the second distance corresponding to alternating thickness of the alternating filter media.

3. The multi-domain electrostatic filter system of claim 1, further comprising a plurality of sensors, wherein the plurality of sensors include a first group of sensors in communication with an inlet side of the multi-domain electrostatic filter system, a second group of sensors in communication with an outlet side of the multi-domain electrostatic filter system, and a voltage current sensor.

4. The multi-domain electrostatic filter system of claim 3, wherein the first group of sensors includes a flow switch and a vacuum transducer.

5. The multi-domain electrostatic filter system of claim 3, wherein the second group of sensors includes a pressure transducer, a water sensor and a temperature sensor.

6. The multi-domain electrostatic filter system of claim 1, wherein the output of the voltage generator is about −15 kV.

7. The multi-domain electrostatic filter system of claim 1, wherein the positive electrode plates each have a first circumference and the negative electrode plates each have a second circumference, and wherein the first circumference is larger than the second circumference.

8. The multi-domain electrostatic filter system of claim 3, wherein the plurality of sensors further include a float switch arranged to detect a leak of fluid from the multi-domain electrostatic filter system.

9. The multi-domain electrostatic filter system of claim 1, wherein the electrically conductive filter vessel comprises a single chamber, and wherein the multi-domain electrostatic filter system is configured to filter fluid passing through the multi-domain electrostatic filter and to remove water from the fluid passing through the multi-domain electrostatic filter within the single chamber.

10. The multi-domain electrostatic filter system of claim 1, wherein the positive electrode plates and the negative electrode plates are treated:
  removing an oxide layer from surfaces of the positive electrode plates and the negative electrode plates by submerging the positive electrode plates and the negative electrode plates in a first chemical bath;
  removing the positive electrode plates and the negative electrode plates from the first chemical bath;
  drying the positive electrode plates and the negative electrode plates;
  spraying the positive electrode plates and the negative electrode plates with a chemical;
  permitting the chemical to evaporate from the surfaces of the positive electrode plates and the negative electrode plates;
  submerging the positive electrode plates and the negative electrode plates in a second chemical bath;
  removing the positive electrode plates and the negative electrode plates from the second chemical bath; and
  drying the positive electrode plates and the negative electrode plates.

* * * * *